3,170,908

CATALYST AND PROCESS FOR POLYMERIZATION OF PROPYLENE

Vernon D. Floria and William J. Raich, Midland, Mich., assignors to The Dow Chemical Company, Midland, Mich., a corporation of Delaware No Drawing. Filed Apr. 12, 1962, Ser. No. 186,847
7 Claims. (Cl. 260—93.7)

This invention relates to a new catalyst and process for polymerization of ethylenically unsaturated monomers such as propylene. More particularly it concerns a catalytically active structure comprising a base metal such as metallic copper having a surface of reaction with a titanium tetrahalide and activated with an activator which is a chemical compound having a metal-to-hydrocarbon bond.

It is known, e.g., from Belgian Patents 533,362; 538,782; and 543,259, to polymerize ethylene, propylene and higher olefins in the presence of Ziegler-type catalysts such as mixtures of titanium tetrachloride or titanium trichloride and an alkylaluminum. It is known that the polymer products of polymerization of propylene with titanium tetrachloride-alykyl-aluminum catalysts tend to be largely amorphous (atactic) whereas polypropylene made from titanium trichloride-alkylaluminum catalysts are more highly crystalline (isotactic).

It is also known that, whether the polymerization is carried out in the solution or slurry process, the full potential of the cataylst is not attained, i.e., that not as much polymer is produced per unit of catalyst as the catalyst is capable of producing. This is partly because of the tendency of the polymer to engulf or encapsulate the catalyst and partly because of the carrying of active catalyst out of the reactor with withdrawn polymer. Other factors also contribute, such as the necessity of diluting the reaction mixture with inert liquid diluent in order to maintain a workable, stirrable, flowable slurry or solution.

Accordingly, it is an object of this invention to provide a cataylst and process for polymerization of ethylenically unsaturated materials, especially propylene, whereby to enable a ready separation of polymer product from the active catalyst and to enable continued use and reuse of the catalyst for such polymerization. Other objects and advantages of the invention will be evident in the following description.

The objects of this invention have been attained in the discovery of a novel catalyst and polymerization process wherein the catalyst, broadly contemplated, is composed of a base metal element, such as metallic copper, having a surface of reaction with titanium tetrahalide and thereby coated with a titanium-containing coating and activated with an activator which is a chemical compound having a metal-to-hydrocarbon bond, such as an organoaluminum compound.

The novel catalyst of this invention is obtained by bringing a titanium tetrahalide into contact with a metal base such as metallic copper until the surface of the latter comprises a closely adhering titanium-containing layer or deposit. The resulting metal element having a surface of reaction with the titanium tetrahalide is activated by the activator having a metal-to-hydrocarbon bond for polymerization of ethylenically unsaturated monomers.

The metallic base component of the catalyst structure is provided in any form, such as sheets, strips, ribbons, foils, wires, or bits thereof, or beads, flakes or granules, or fabricated shapes. Advantageously, the structure of the metallic support is selected so that the catalyst can easily be charged to the polymerization reactor so that a large active surface is presented to the polymerization reaction mixture, and so that the catalyst is easily separated from the polymer product, e.g., retained in the polymerization reactor while the polymer is removed therefrom. For the reasons just stated, powdered and other finely divided forms of the base metal material are excluded for the purposes of this invention.

At least a portion of the surface of the metallic supporting elements is reacted with a titanium tetrahalide. For practical reasons of convenience and economy, titanium tetrachloride and titanium tetrabromide are preferred. The metallic support is exposed to the titanium tetrahalide preferably in the liquid form, although vapors of titanium tetrachloride are also effective. An inert liquid diluent for the titanium tetrahalide may be used if desired. The reaction is accelerated by heat, preferably below 200° C., e.g., at reflux. The time of reaction, generally inverse to the temperature, is such that the desired degree of reaction of the metallic surface is attained to provide on such surface a closely adherent layer or deposit containing titanium.

The metal of the base supporting structure of the catalyst is conveniently one of the common base metals such as copper, zinc, cadmium, iron, tin, titanium, chromium, lead, aluminum, nickel, cobalt, or alloys thereof with each other or with other metals.

In one embodiment, clean copper beads are covered with titanium tetrachloride under an inert atmosphere. The titanium tetrachloride is heated to reflux until the copper beads are covered with a dark purple-black coating. The titanium tetrachloride is poured off, and the beads are washed, e.g., with dry n-hexane, until free of unreacted titanium tetrachloride.

The consumption of titanium tetrahalide is very small, and the unreacted titanium tetrahalide can be used for reaction with further quantities of metallic support material or used in other ways.

The metallic structures having a surface chemically reacted with titanium tetrahalide and coated with a titanium-containing surface coating are stable but are preferably stored out of contact with air and active hydrogen compounds such as water and acids, e.g., in an inert atmosphere such as nitrogen or under an inert liquid such as a liquid saturated hydrocarbon.

In the preparation of a polymerization-active catalyst, the metallic base material such as copper having a surface of reaction with titanium tetrahalide is activated by and with an activator which is a chemical compound having a metal-to-hydrocarbon bond. Suitable activators are ones having at least one hydrocarbon radical attached to a metal atom, e.g., a metal of Group I through Group IV of the Periodic Table of the Elements, such as Li, Na, K, Mg, Zn, Cd, Hg, Al, Sn, Pb, etc. The hydrocarbon radical can be aliphatic such as alkyl or aromatic such as aryl. In the case of polyvalent metals, diverse other radicals can be attached to the metal, such as H, O, OH, OX, X, OR etc. where X is halogen and R is hydrocarbon, provided there is at least one hydrocarbon radical attached to the metal atom.

Particularly preferred activators are organo-aluminum compounds having at least two hydrocarbon radicals, e.g., aryl or aralkyl groups, bonded to aluminum. The identity of the third substituent on the aluminum atom is immaterial and may, for example, be hydrogen, halogen, alkoxy, aroxy, aryl, aralkyl or alkyl. The term "alkyl" is used herein to signify any straight chain, branched chain, or cyclic saturated aliphatic hydrocarbon monovalent radical such as methyl, ethyl, propyl, isopropyl, n-butyl, isobutyl, sec-butyl, tert-butyl, pentyl, cyclopentyl, hexyl, cyclohexyl, heptyl, octyl, decyl, dodecyl, hexadecyl octadecyl, etc. and isomers and homologues thereof. The term "aryl" is used herein to signify an aromatic hydrocarbon radical having at least one benzene ring, such as phenyl, biphenyl, naphthyl, etc., and such radicals which are substituted with one or more alkyl or aralkyl radicals. The term "aralkyl" is used herein to signify an alkyl radical substituted with an aryl radical, both as herein defined. Specific examples of suitable alkylaluminum activators, for purpose of illustration and not of limitation, are trimethylaluminum, triethylaluminum, tripropylaluminum, triisopropylaluminum, tributylaluminum, triisobutylaluminum, trihexylaluminum, trioctylaluminum, tridodecylaluminum, trihexadecylaluminum, diethylaluminum chloride, diethylaluminum bromide, diethylaluminum iodide, diethylaluminum hydride, diisobutylaluminum chloride, diisobutylaluminum bromide, diisobutylaluminum iodide, diisobutylaluminum hydride, lithium aluminum tetraethyl, sodium aluminum tetraisopropyl, etc.

The amount of activator compound having a metal-to-hydrocarbon bond that is added to the metallic elements having a surface of reaction with a titanium tetrahalide is not critical. Usually the activator is brought into contact with the surface-reacted metal in the form of a solution of the activator in an inert liquid diluent suitable for use as a polymerization reaction medium in which the concentration of activator is at least about 0.001 molar, preferably 0.01 molar or more, the upper limit being only the practical and economic considerations. Conveniently, the kind and concentration of the activator is selected by the one skilled in the art and additional quantities of activator are added during the course of the ensuing polymerization to initiate and propagate the same.

Inert liquid diluents suitable for use with the new catalysts are those already known as polymerization media in this kind of art. Preferred are liquid saturated hydrocarbons such as alkanes and cycloalkanes and aromatic hydrocarbons having no aliphatic unsaturation; specific examples are butane, pentane, hexane, cyclohexane, heptane, octane, mineral spirits, kerosene, mineral oil, benzene, toluene, xylene, etc.

In carrying out the polymerization process of this invention, a polymerizable ethylenically unsaturated monomer or mixture thereof is brought into contact with the catalyst structure described above under polymerization conditions of temperature, pressure, etc. Any ethylenically unsaturated monomer that is polymerizable with Ziegler-type catalysts is polymerizable with the new catalysts. Commonplace examples of suitable monomers, for purpose of illustration and not of limitation, are olefinic hydrocarbons having terminal unsaturation such as ethylene, propylene, 1-butene, 1-pentene, 1-hexene, 1-heptene, 1-octene, 1-decene, 1-dodecene, etc. and their branched isomers, particularly ones having the structural formula $CH_2{=}CHR$ where R is hydrogen or alkyl, and styrene-type compounds having the formula just given where R is aryl.

The temperature employed in the polymerization process is not critical although it will be understood that its selection may influence the rate of polymerization and the operational characteristics of the process. For practical reasons, the temperature is usually from about room temperature to about 300° C., commonly from 50° to 150° C. The pressure is not critical and can range from sub-atmospheric to as high as is technically possible.

It is an unexpected feature of the present catalysts and process of polymerization that the polymer separates from the catalyst whereby the latter is enabled to continue to function as initiator and promoter of polymerization and in the production of further polymer. The process is advantageously adapted to batch procedures where the polymer product, in solution or slurry in the inert liquid polymerization reaction medium, is mechanically separated, e.g., by decantation or screening, from the catalyst. Polymer coating, if any, on the catalyst surface can be dissolved in suitable inert solvents at polymer solution temperatures or can be mechanically eroded, e.g., by grinding or scraping action of agitators, sweeps, etc. The process is further advantageously adapted to continuous removal from the reaction zone while the catalyst is retained therein, e.g., by constructing the catalyst on structurally fixed elements in the reaction zone or by retaining loose catalyst elements such as beads in the reaction zone with screens or the like.

The polymer product of the use of the new catalysts and process of polymerization is recovered from the reaction mixture slurry or solution, freed of metal residues and liquid diluent, and processed in usual ways known to this kind of art.

The following example illustrates the invention but should not be construed as limiting its scope. Parts and percentages are by weight.

*Example*

Copper beads were washed with 10 percent aqueous hydrochloric acid, water, and acetone, and dried under vacuum. The clean dry beads were placed in a reflux vessel and covered with titanium tetrachloride under an atmosphere of dry nitrogen. The titanium tetrachloride was heated to reflux at atmospheric pressure and refluxed for 24 hours. The copper beads became coated with a dark purple to black layer. The excess titanium tetrachloride was poured off and was suitable for further use. The coated beads were washed several times with n-hexane, in a dry nitrogen atmosphere.

The coated beads were placed in a polymerization reactor together with n-hexane containing triethylaluminum as activator at 0.02 molar concentration. Propylene was passed into the reactor at 100 p.s.i.g. and the reaction mixture was maintained at 80° C. for four hours with agitation. The reaction was terminated by venting unreacted propylene from the reactor and cooling the reaction mixture to below the atmospheric boiling point.

The polymer-diluent slurry was separated from the catalyst beads which were useful for further polymerization. The polymer-diluent slurry was treated with alcoholic hydrochloric acid. There were recovered 130 parts of solid polymer insoluble in the n-hexane and 23 parts of polymer soluble in the diluent. Of the hexane-insoluble polymers, 16.9 percent was soluble in boiling ether. The ether-insoluble polypropylene had a specific viscosity of 0.167 at 0.05 gram per deciliter of tetrahydronaphthalene at 135° C.

In place of titanium tetrachloride and copper beads in the preparation of the catalyst structures, other titanium tetrahalides, particularly titanium tetrabromide, and other base metal forms are used with substantially the same results as in the foregoing example. Other ethylenically unsaturated monomers polymerizable with Ziegler-type catalysts can be polymerized instead of propylene, and mixtures of such monomers can be copolymerized to high molecular weight products. In place of triethylaluminum, other compounds having a metal-to-hydrocarbon bond can be used to activate the coated metal elements.

That which is claimed is:

1. A catalyst structure catalytically active in the polymerization of ethylenically unsaturated monomers, which catalyst structure is composed of metallic copper having a surface comprising the product obtained by reaction of the copper surface by heating with a titanium tetrahalide, which catalyst structure is substantially free of unreacted titanium tetrahalide and activated with an activator having a metal-to-hydrocarbon bond.

2. A catalyst structur catalytically active in the polymerization of ethylenically unsaturated monomers, which catalyst structure is composed of metallic copper having a surface comprising the product obtained by reaction of the copper surface by heating with titanium tetrachloride, which catalyst structure is substantially free of unreacted titanium tetrachloride and activated with an organoaluminum compound having at least two hydrocarbon radicals bonded to aluminum.

3. A catalyst structure according to claim 2 wherein the organoaluminum activator is a trialkylaluminum.

4. In the polymerization of an ethylenically unsaturated α-monoolefin monomer by contacting the same at a polymerization temperature with a reaction mixture of a polymerization-active catalyst and an inert liquid diluent medium, the improvement which comprises carrying out the polymerization with a polymerization-active catalyst structure composed of metallic copper having a surface comprising the product obtained by reaction of the copper surface by heating with a titanium tetrahalide, which catalyst structure is substantially free of unreacted titanium tetrahalide and activated with a chemical compound having a metal-to-hydrocarbon bond.

5. In the polymerization of an ethylenically unsaturated α-monoolefin monomer by contacting the same at a polymerization temperature with a reaction mixture of a polymerization-active catalyst and an inert liquid diluent medium, the improvement which comprises carrying out the polymerization with a polymerization-active catalyst structure composed of metallic copper having a surface comprising the product obtained by reaction of the copper surface by heating with titanium tetrachloride, which catalyst structure is substantially free of unreacted titanium tetrachloride and activated with an organoaluminum compound having at least two hydrocarbon radicals bonded to aluminum.

6. The improvement according to claim 5 wherein the organoaluminum activator is a trialkylaluminum.

7. The improvement according to claim 5 wherein the ethylenically unsaturated monomer is propylene.

References Cited in the file of this patent

UNITED STATES PATENTS

| | | |
|---|---|---|
| 2,871,276 | Eiszner | Jan. 27, 1959 |
| 2,928,820 | D'Alelio | Mar. 15, 1960 |
| 2,931,792 | Aries | Apr. 5, 1960 |
| 2,933,485 | D'Alelio | Apr. 19, 1960 |

FOREIGN PATENTS

| | | |
|---|---|---|
| 837,251 | Great Britain | June 9, 1960 |